US006192457B1

(12) United States Patent
Porterfield

(10) Patent No.: US 6,192,457 B1
(45) Date of Patent: *Feb. 20, 2001

(54) METHOD FOR IMPLEMENTING A GRAPHIC ADDRESS REMAPPING TABLE AS A VIRTUAL REGISTER FILE IN SYSTEM MEMORY

(75) Inventor: A. Kent Porterfield, New Brighton, MN (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/887,868

(22) Filed: Jul. 2, 1997

(51) Int. Cl.7 ..................................................... G06F 17/60

(52) U.S. Cl. .......................... 711/206; 711/202; 711/203; 711/205; 711/2

(58) Field of Search .................................... 711/206, 100, 711/202, 203, 2; 395/419, 503, 415

(56) References Cited

U.S. PATENT DOCUMENTS

| | | | |
|---|---|---|---|
| 4,067,058 | 1/1978 | Brandstaetter et al. | 364/200 |
| 4,382,278 | 5/1983 | Appelt | 364/200 |
| 4,481,573 | 11/1984 | Fukunaga et al. | 364/200 |
| 4,747,044 | 5/1988 | Schmidt et al. | 364/200 |
| 4,757,438 | 7/1988 | Thatte et al. | 364/200 |
| 4,787,026 | 11/1988 | Barnes et al. | 364/200 |
| 4,855,940 | 8/1989 | Richardson et al. | 364/526 |
| 4,941,111 | 7/1990 | Sfarti | 364/521 |
| 5,095,427 | 3/1992 | Tanaka et al. | 395/700 |
| 5,235,677 | 8/1993 | Needle et al. | 395/131 |
| 5,293,593 | 3/1994 | Hodge et al. | 711/202 |
| 5,321,836 | 6/1994 | Crawford et al. | 395/400 |
| 5,479,627 | 12/1995 | Khalidi et al. | 395/415 |
| 5,481,688 | 1/1996 | Takagi | 364/418 |
| 5,517,611 | 5/1996 | Deering | 395/503 |
| 5,519,450 | 5/1996 | Urbanus et al. | 348/600 |
| 5,564,031 | 10/1996 | Amerson et al. | 395/419 |
| 5,675,773 | 10/1997 | Devic | 395/503 |
| 5,737,553 | 4/1998 | Bartok | 395/339 |
| 5,793,385 | 8/1998 | Nale | 345/515 |

*Primary Examiner*—John W. Cabeca
*Assistant Examiner*—Pierre M. Vital
(74) *Attorney, Agent, or Firm*—Dorsey & Whitney

(57) ABSTRACT

A method for implementing a graphics address remapping table as a virtual register in system memory. The remapping table includes virtual registers that each store a target index that references a block of the system memory that stores graphics data. The method uses an indirect addressing scheme that enables the individual virtual registers of the remapping table to be accessed in response to a transaction request. Accessing a selected virtual register indirectly requested by the transaction request enables the method to access graphics data pointed to by the selected virtual register.

15 Claims, 4 Drawing Sheets

METHOD FOR IMPLEMENTING A GRAPHIC ADDRESS REMAPPING TABLE AS A VIRTUAL REGISTER FILE IN SYSTEM MEMORY

CROSS-REFERENCE TO RELATED APPLICATION

This application is related to an application entitled System for Implementing a Graphic Address Remapping Table as a Virtual Register File in System Memory, Ser. No. 08/886,525, filed on Jul. 2, 1997, which is currently pending.

TECHNICAL FIELD

The present invention relates to processing graphics transactions in a computer system, and more particularly, to allocating address space to a system memory and to other computer devices.

BACKGROUND OF THE INVENTION

In recent years computer users have demanded ever increasing amounts of information to be displayed in a graphical form. Displaying information in graphical form requires very large amounts of memory to store the graphics data that produces a graphical display. Recently many developers have created three-dimensional graphical display applications that further multiply the amount of data needed to create a graphical display.

A portion of a typical computer system that implements graphical display applications is shown in FIG. 1. The computer system 10 includes a processor 12 coupled by a processor bus 14 to a system controller 16. The computer system 10 also includes a system memory 18 coupled by a memory bus 20 to the system controller 16. The computer system 10 also includes a graphics controller 22 coupled by a Peripheral Component Interconnect (PCI) bus 24 to the system controller 16. The graphics controller 22 controls how graphics images are displayed on a graphics monitor 26 coupled to the graphics controller. Also coupled to the graphics controller 22 is a local frame buffer 28 that stores graphics information that is used to display the graphics images on the graphics monitor 26.

Typically, a portion of the graphics data used to produce graphical displays is stored in the local frame buffer 28 while another portion of the graphics data is stored in the system memory 18. The speed at which the graphics controller 22 can display graphics on the graphics monitor 26 is limited by the speed at which the graphics controller 22 can receive the graphics data from the system memory 18. The speed at which the graphics controller 22 can retrieve the graphics data from the system memory 18 is limited by the speed of the PCI bus 24.

A relatively new bus, known as an Accelerated Graphics Port (AGP), for connecting graphics controllers, such as the graphics controller 22, to system controllers, such as the system controller 16, has been developed by Intel Corporation to replace PCI buses for graphics applications. The preferred AGP bus provides the graphics controller 22 with a continuous view of the address space for the graphics data in the system memory 18. However, because the system controller 16 typically dynamically allocates the system memory 18 in random 4-kilobyte pages, it is necessary to provide an address mapping mechanism that maps the random 4-kilobyte pages into a single, contiguous address space. According to the specification published by Intel on Jul. 31, 1996 for the AGP bus, the address remapping is accomplished via a table called the graphics address remapping table (GART).

The Intel AGP specification suggests that the GART be implemented in a system controller, such as the system controller 16. However, implementing the GART in the system controller 16 likely would require a very large number of programmable registers. Such programmable registers would require many transistors, and thus, likely would be prohibitively expensive to manufacture.

SUMMARY OF THE INVENTION

An embodiment of the present invention is directed to a method for executing transaction requests from a memory requester in a computer system having a system memory. The method stores in the system memory a remapping table having virtual registers, each storing a pointer that references a target location in the system memory. In response to receiving from the memory requester a transaction request that includes a requested virtual address, the method converts the requested virtual address to a physical address of a selected one of the virtual registers of the remapping table. The pointer stored in the selected virtual register is retrieved and used to access a selected target location in the system memory. The remapping table may be a graphics address remapping table having virtual registers that store pointers referencing graphics data stored in the system memory.

Another embodiment of the invention is directed to a method of managing system memory in a computer system having a system controller that controls the system memory. In response to receiving a request to load selected graphics data into the system memory, the method causes the memory manager to stores the selected graphics data in a selected memory block of the system memory. A target index is then stored in a data register of the system controller that points to a reference location of the selected memory block. A virtual register offset referencing a selected virtual register in the system memory is then stored in an index register of the system controller. The target index is read from the data register and written to the selected virtual register referenced by the virtual register offset stored in the index register.

DETAILED DESCRIPTION OF THE INVENTION

Figure 1:
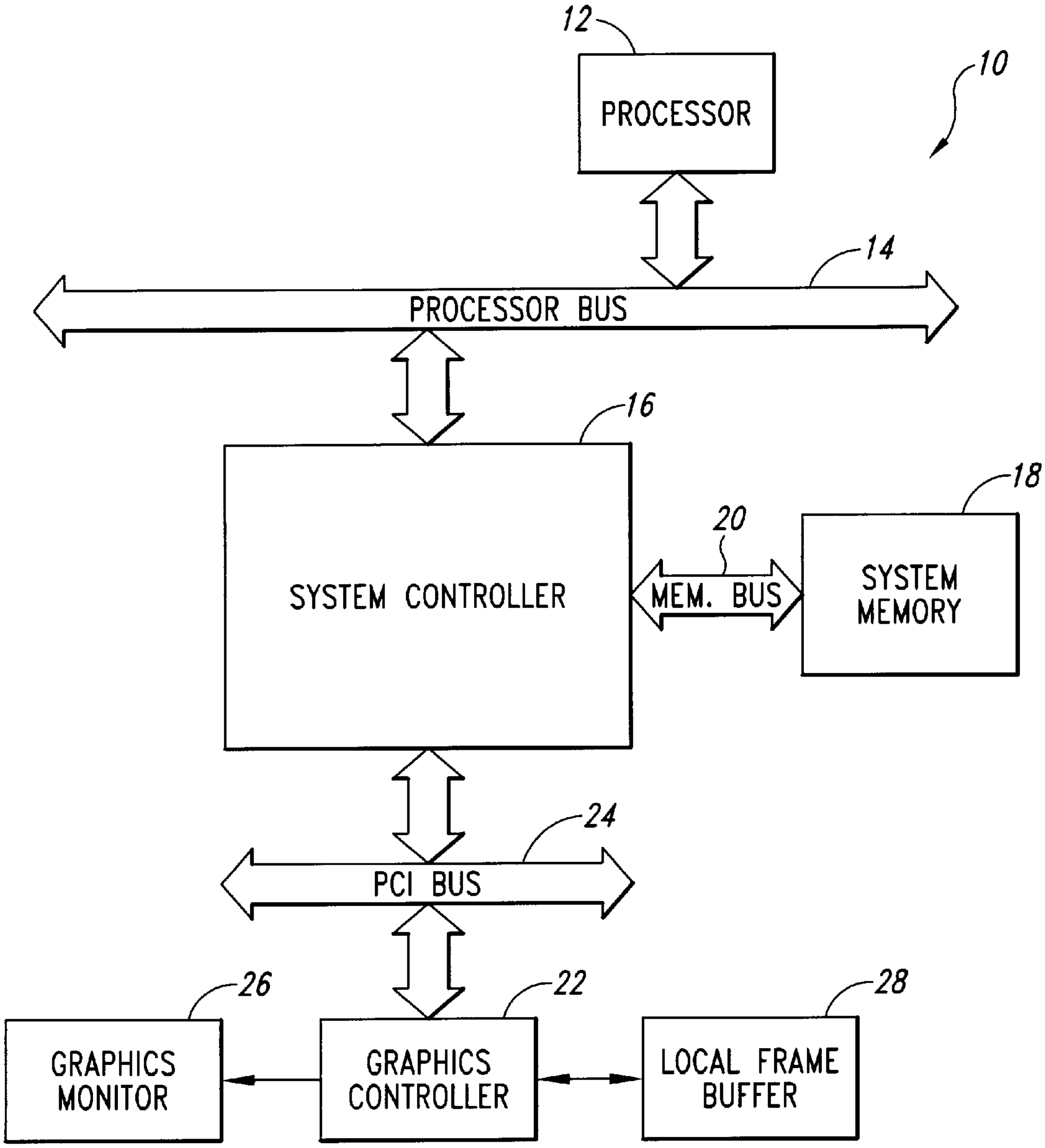
Fig. 1 (Prior Art)
FIG. 1 is a block diagram of a prior art computer system.
Figure 2:
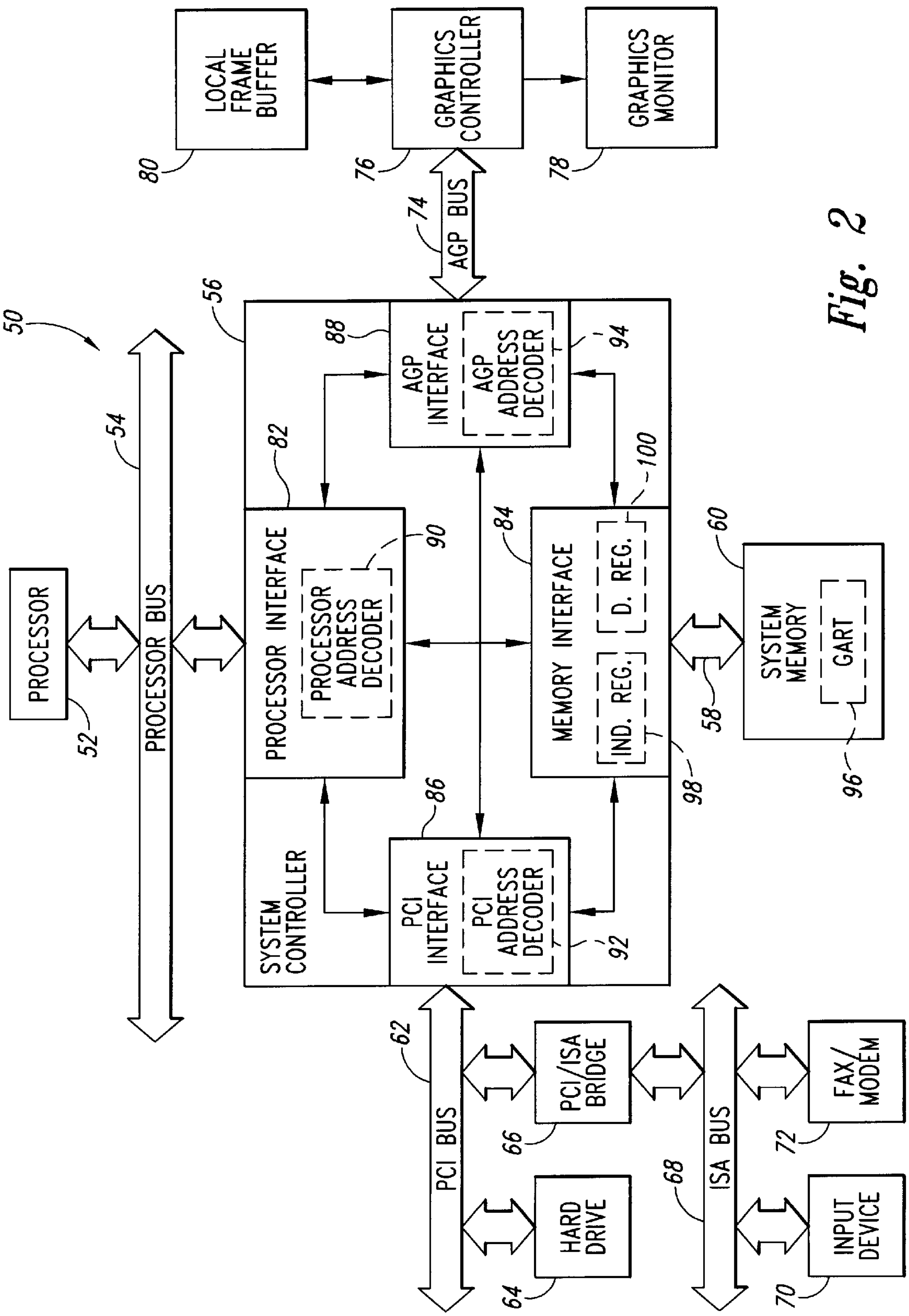
FIG. 2 is a block diagram of a computer system operating according to one embodiment of the present invention for implementing a graphic address remapping table as a virtual register file in system memory.

A computer system 50 for executing transaction requests according to one embodiment of the present invention is shown in FIG. 2. The computer system 50 includes a processor 52 coupled by a processor bus 54 to a system controller 56 which can also be referred to as the system core logic or chipset. The processor 52 can include any microprocessor, such as the Pentium™ Pro microprocessor from Intel Corp. Coupled to the system controller 56 by a memory bus 58 is a system memory 60 generally comprised of dynamic random access memory (DRAM), which stores software instructions and data that is used by the processor

52 to perform a specified function. The software instructions include application programs and an operating system, such as Microsoft Windows NT™, that interfaces the application programs with the hardware of the computer system 50.

The system controller 56 is coupled by an expansion bus 62, such as a Peripheral Component Interconnect (PCI) bus, to a plurality of PCI computer devices, such as a hard drive 64 and a PCI/ISA bridge 66. The PCI/ISA bridge 66 couples the PCI bus 62 to an Industry Standard Architecture (ISA) bus 68. Coupled to the ISA bus 68 are a plurality of ISA computer devices, such as an input device 70 and a fax/modem 72. The input device 70 can include any of numerous known input devices, such as a keyboard, mouse, and electronic pen and tablet. It will be appreciated that expansion buses other than PCI buses and ISA buses and other computer devices coupled to the expansion buses may be used.

The system controller 56 is coupled by an Accelerated Graphics Port (AGP) bus 74 to a graphics controller 76. The AGP bus 74 is a high performance interconnect that enables the graphics controller 76 to access graphics information from the system memory 60 at a very high rate. The graphics controller 76 controls how graphics images are displayed on a graphics monitor 78 coupled to the graphics controller. Also coupled to the graphics controller 76 is a local frame buffer 80 that stores graphics information that is used to display the graphics images on the graphics monitor 78. Typically, the graphics information stored in the system memory 60 includes texture maps which are models of surface textures that are shared by different images displayed on the graphics monitor 78. The local frame buffer 80 typically stores other graphics information, such as Z buffers which are used to create 3-dimensional graphics images. It should be appreciated that any graphics information could be stored in either the system memory 60 or the local frame buffer 80 depending on the particular implementation provided by the processor 52 or the graphics controller 76.

The system controller 56 provides an interface between the processor 52, system memory 60, PCI bus 62, and graphics controller 76. The system controller 56 includes a processor interface 82 that controls how data is received from or sent to the processor 52 via the processor bus 54. The system controller 56 also includes a memory interface 84 that controls how data is written to and read from the system memory 60. It will be appreciated that other memory configurations are possible, such as including a direct data bus connection between the processor bus 54 and the system memory 60 to allow data to be transmitted directly between the processor bus 54 and the system memory 60 without passing through the system controller 56.

The system controller 56 also includes a PCI interface 86 and an AGP interface 88, each coupled to the processor interface 82 and the memory interface 84. The PCI interface 86 controls data being transferred to or from the hard drive 64, input device 70, and fax/modem 72 via the PCI bus 62. The AGP interface 88 controls how data is transmitted across the AGP bus 74 between the graphics controller 76 and the system controller 56. The AGP interface 88 primarily couples read requests received from the graphics controller 76 via the AGP bus 74 to the system memory 60 via the memory interface 84 to allow the graphics controller 76 to read graphics data stored in the system memory 60.

The processor interface 82, PCI interface 86, and AGP interface 88 include a processor address decoder 90, a PCI address decoder 92, and an AGP address decoder 94, respectively. Each of the address decoders 90–94 stores a system address allocation table that specifies which system addresses are being allocated to the various components of the computer system 50. For example, each system address allocation table may specify that a first portion of the system memory 60 is allocated addresses 0 through 15 M, the ISA bus 68 is allocated addresses between 15 M and 16 M, a second portion of the system memory 60 is allocated addresses between 16 M and 24 M, and the PCI bus 62 is allocated addresses above 24 M. The addresses allocated for each computer device in the system address allocation table typically will be set by the Basic Input-Output System (BIOS) software when the computer system 50 is initialized upon being turned ON.

When the processor 52 transmits on the processor bus 54 a transaction request for access to one of the component devices of the computer system 50, the processor interface 82 queries the processor address decoder 90 regarding whether to forward the transaction request to the memory interface 84, PCI interface 86, or AGP interface 88. For example, if the processor 52 issues a transaction request to read from system address 15.5 M, the processor interface 82 determines from the processor address decoder 90 that system address 15.5 M belongs to the ISA bus 68. As a result, the processor interface 82 passes the transaction request to the PCI interface 86 which forwards the transaction request to the ISA bus 68 via the PCI bus 62 and the PCI/ISA bridge 66.

As discussed above, much of the graphics data used to display graphics images on the graphics monitor 78 is stored in the system memory 60. As is typical, the memory interface 84 dynamically allocates the system memory 60 in memory blocks, such as four kilobyte (KB) pages, in response to a request to load data in the system's memory. However, to keep logical independence from the dynamic allocation of the system memory 60, the graphics data stored in the system memory 60 is addressed as a contiguous block of logical addresses. As a result, it is necessary to provide an address mapping mechanism that maps the 4 KB pages into the contiguous block of logical address space.

The Intel AGP specification proposes the use of a graphics address remapping table (GART) stored in a system controller to map the random 4 KB pages into the contiguous block of logical address space. However, the system controller typically is implemented using an application-specific integrated circuit (ASIC), so locating the GART on the system controller 56 would require many transistors, and thus, likely would be prohibitively expensive to manufacture.

In contrast to prior art methods of operating computer systems in which a GART is included in a system controller, the computer system 50 stores and maintains a GART 96 within the system memory 60. The GART 96 maps the dynamically allocated 4 KB pages to the contiguous block of logical addresses and is maintained by the memory interface 84. For example, when the memory interface 84 loads graphics data into a page beginning at 10 M, the memory interface 84 also stores in a register of the GART 96 a data value that points to memory location 10 M.

The GART 96 can be implemented within the system memory 60 as a virtual register file that is accessed by the memory interface 84 as needed. In order to initialize and maintain individual virtual registers within the GART 96, the memory interface 84 includes an index register 98 and a data register 100. Whenever graphics data is requested to be loaded into the system memory 60 from another memory device, such as the hard drive 64, the operating system of the computer system 50 causes the memory interface 84 to allocate one or more 4 KB pages for the graphics data. For each new 4 KB page allocated, the memory interface 84 updates the GART 96 by storing in a selected virtual register of the GART a target index that points to the 4 KB page. The memory interface 84 updates the GART 96 by loading into the index register 98 an offset value that points to the location of the selected virtual register of the GART 96 and loads into the data register 100 the target index to be stored in the selected virtual register. For example, assuming that the GART 96 begins at physical address 15 M, the memory interface 84 may load a value of 8 into the index register 98 and a data value of 20 into the data register 100. The memory interface 84 then will store the data value of 20 into the GART register at memory location 15 M+8. The memory interface 84 also will load graphics data into a 4 KB page beginning at memory location 20.

One should distinguish between the functions of the address decoders 90–92, and the GART 96. The address decoders 90–92 allocate system addresses to the system memory 60 and PCI bus 62. The GART 96 is a virtual register file stored in the system memory 60 and includes virtual registers storing target indexes pointing to graphics data stored in other portions of the system memory 60.

Figure 3:
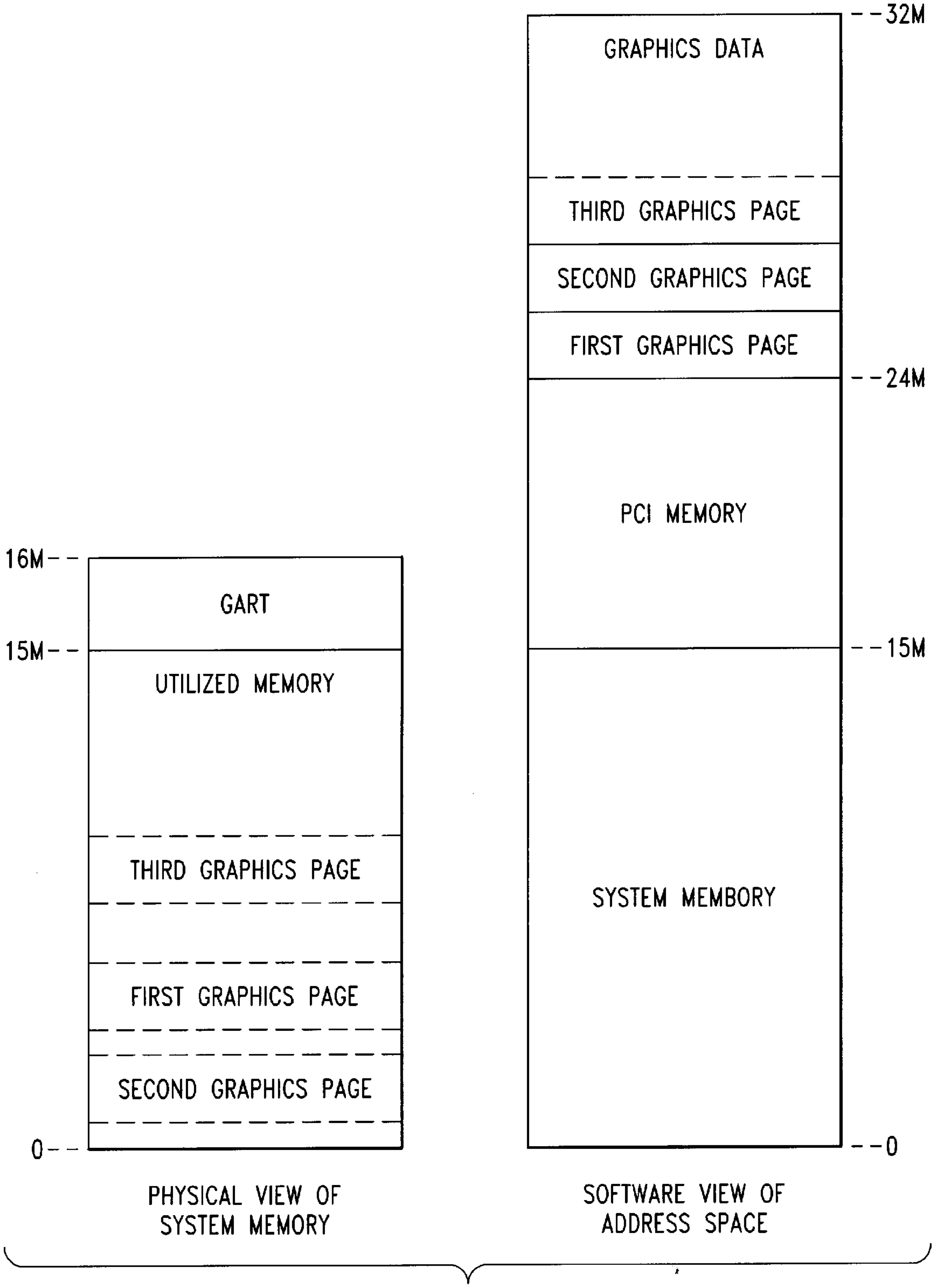
FIG. 3 is a block diagram of system memory and address space of the computer system shown in FIG. 2.

The computer system 50 employs a direct addressing technique for the PCI bus 62 and part of the system memory 60 and an indirect addressing technique to maintain and access graphics data in the system memory 60 as shown in FIG. 3. In the direct addressing technique, the address decoders 90–94 allocate physical system addresses, such as addresses zero through 15 M, to the system memory 60 and allocate physical system address, such as addresses 15 M through 24 M, to the PCI bus 62. The physical system addresses are given to the operating system of the processor 52 to enable the operating system to directly address the system memory 60 and PCI bus 62 by supplying the physical system addresses to the processor address decoder 90 in a transaction request.

The indirect addressing technique involves allocating virtual system addresses to the graphics data as shown in FIG. 3. For example, the address decoders 90–94 may allocate to the graphics data virtual system addresses between 24 M and 32 M. The system addresses allocated to the graphics data are virtual rather than physical because the virtual system addresses are converted to physical addresses between 15 M and 16 M of virtual registers of the GART 96 to access the virtual registers in response to transaction requests for the graphics data which are converted to physical system addresses between 15 M and 16 M when accessing the portion. For example, in response to receiving a transaction request directed to system address 28 M+20 from the processor 52, the processor address decoder 90 will convert the virtual system address of 28 M+20 to physical address 15 M+20 and direct the transaction request to the memory interface 84. The memory interface 84 uses the converted physical address 15 M+20 to access the location in the virtual register in the GART 96 corresponding to physical address 15 M+20.

It will be appreciated that by employing two allocation schemes, the address decoders 90–92 can access two separate computer devices with the same physical address. In the first allocation scheme, the address decoders 90–94 employ direct addressing to allocate system addresses between 15 M and 16 M to the PCI bus 62. In the second allocation scheme, the address decoders 90–94 employ indirect addressing to allocate the same physical addresses between 15 M and 16 M to the memory portion of the system memory 60 that stores the GART 96. When the address decoders 90–94 receive a transaction request for an address between 15 M and 16 M, the address decoders 90–94 will direct the transaction request to the PCI bus 96. When the address decoders 90–94 receive a transaction request directed to an address between 24 M and 32 M, then the address decoders 90–94 convert the address to a physical address between 15 M and 16 M and cause the memory interface 84 to access the GART 96 in the system memory 60 using the converted physical address between 15 M and 16 M.

FIG. 3 illustrates that devices and software external to the system controller 56 view the graphics data as a single contiguous address space even though the graphics data may be stored non-contiguously in the system memory 60. For example, the graphics data may include first, second, and third graphics pages assigned consecutive virtual addresses as shown in the right side of FIG. 3. The actual first, second, and third graphics pages may be stored non-contiguously in the system memory 60 as shown on the left side of FIG. 3. The address decoders 90–94 use the GART 96 to convert the consecutive virtual addresses of the graphics pages to the non-consecutive physical addresses of the graphics pages in the system memory 60.

Figure 4:
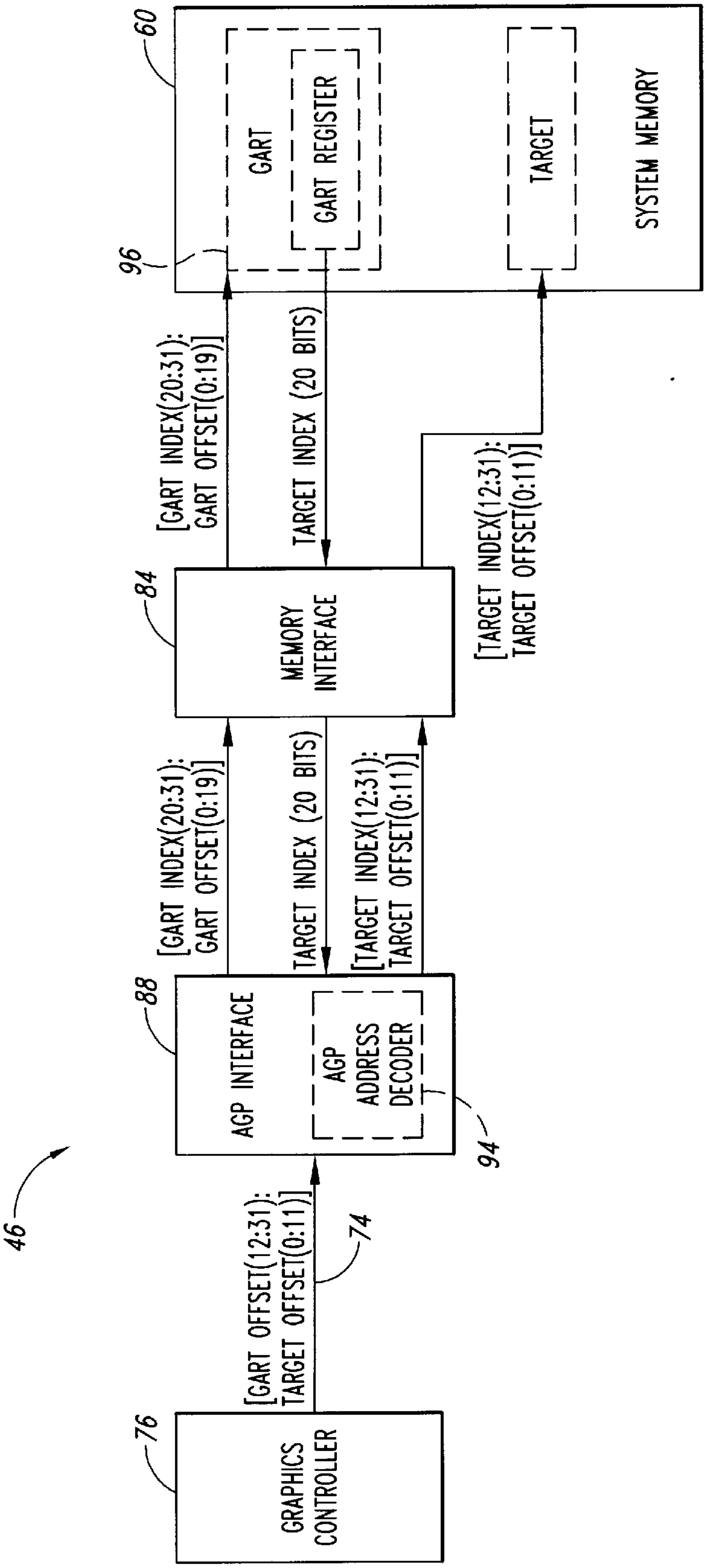
FIG. 4 is a block diagram of a portion of the computer system shown in FIG. 2.

A functional block diagram showing one embodiment of a method for allowing the graphics controller 76 to accesses target graphics data in the system memory 60 is shown in FIG. 4. To access graphics data stored in a target location in the system memory 60, the graphics controller 76 transmits a transaction request across the AGP bus 74 to the AGP interface 88. The transaction request includes an address, such as a 32-bit address, in the embodiment shown in FIG. 4. The address will be one of the virtual system addresses allocated to the graphics data stored in the system memory 60, such as a virtual address between 24 M and 32 M in the embodiment represented in FIG. 3. The lower 12 bits of the virtual address in the transaction request are stored by the AGP interface 88 for use later as a target offset. The upper 20 bits (bits 12–31) of the virtual address in the transaction request are recognized as a GART offset that specifies the location of a GART register relative to the beginning of the GART 96. The AGP address decoder 94 stores a 12-bit GART index that specifies the location (e.g., 15 M) of the beginning of the GART 96. The AGP address decoder 94 combines the 20-bit GART offset with the 12-bit GART index to obtain an absolute GART address pointing to one of the GART virtual registers. For example, if the GART index is the upper 12 bits of 15 M and the GART offset is 100, then the GART virtual register is at memory location 15 M+100.

The AGP address decoder 94 forwards the 32-bit combined GART index and GART offset to the memory interface 84 which reads the contents of the GART virtual register pointed to by the absolute GART address. The GART virtual register stores a 20-bit target index that is returned by the memory interface 84 to the AGP address decoder 94. The AGP address decoder 94 combines the 20-bit target index retrieved from the GART virtual register with the 12-bit target offset transmitted by the graphics controller 76 with the transaction request. The memory interface 84 uses the combined target index and target offset to access the graphics data in the target location in the system memory 60 that is requested by the transaction request transmitted by the graphics controller 76. The target location can be written to or read from depending on the type of transaction request received from the graphics controller 76.

It will be appreciated that other computer devices of the computer system 50, such as the processor 52 or one of the devices coupled to the PCI bus 62, can access the GART 96 in the system memory 60. The method used to access the GART 96 and corresponding graphics data will be identical to that discussed above except that one of the address decoders 90–92 is used instead of the AGP address decoder 94.

Based on the foregoing discussion, it will be appreciated that the disclosed embodiment of the present invention enables a remapping table to be stored in a computer system memory rather than a system controller. Although the foregoing discussion emphasizes allowing a graphics controller access to a graphics address remapping table, the invention is not so limited and the concepts discussed herein can be employed using various other computer devices and remapping tables. The embodiments described herein provide a low-cost alternative to implementing a large register file on a memory interface implemented by an ASIC.

It should be understood that even though numerous advantages of the present invention have been set forth in the foregoing description, the above disclosure is illustrative only. Changes may be made in detail and yet remain within the broad principles of the present invention.

What is claimed is:

1. A method for executing transaction requests from a memory requester in a computer system having a system memory, the method comprising:

storing a remapping table in the system memory, the remapping table including virtual registers each storing a pointer that references a target location in the system memory;

receiving from the memory requester a transaction request that includes a requested virtual address;

converting the requested virtual address to a physical address of a selected one of the virtual registers of the remapping table;

accessing a selected target location using the pointer stored in the selected virtual register;

storing in an index register an index that references the selected virtual register of the remapping table;

storing in a data register the pointer that references the selected memory location in the system memory; and writing the pointer stored in the data register to the selected virtual register, using the index stored in the index register.

2. The method of claim 2, further comprising:

storing a remapping table index that points to a reference location of the remapping table, wherein the converting step includes combining the remapping table index with a first portion of the requested virtual address to obtain the physical address of the selected virtual register.

3. The method of claim 3, further comprising:

using a second portion of the requested virtual address, together with the pointer stored in the selected virtual register, to access the selected target location in the system memory.

4. The method of claim 2 wherein the receiving step includes receiving at a graphics interface the transaction request from a graphics controller, the remapping table being a graphics address remapping table, and the target addresses store graphics data for use by the graphics controller.

5. The method of claim 2 wherein the pointer stored in the selected virtual register points to a reference location of a memory page and the requested virtual address includes a target offset portion that indicates a position of the selected target location relative to the reference location, wherein the step of accessing the selected target location includes combining the target offset portion with the pointer stored in the selected virtual register.

6. A method for executing transaction requests in a computer system having a system memory, the method comprising:

receiving a request to load selected data into the system memory;

storing the selected data in a selected memory block of the system memory, the selected memory block having a target index that points to a reference location of the selected memory block;

storing the target index in a selected virtual register of a remapping table stored in the system memory;

receiving a transaction request that includes a requested virtual address, the requested virtual address including a virtual register pointer that points to the selected virtual register within the remapping table and a target offset that points to a selected target location within the selected memory block;

accessing the selected virtual register using the virtual register pointer and obtaining the target index stored therein; and accessing the selected target location using the target index and the target offset; and wherein the step of storing the target index in the selected virtual register comprises:

storing in an index register the virtual register pointer that points to the selected virtual register within the remapping table;

storing in a data register the target index that points to the reference location of the selected memory block; and writing the target stored in the data register to the selected virtual register, using the virtual register pointer stored in the index register.

7. The method of claim 6, further comprising:

storing a remapping table index that points to a reference location of the remapping table, wherein the step of accessing the selected virtual register includes combining the remapping table index with the virtual register pointer to obtain a physical address of the selected virtual register.

8. The method of claim 6 wherein the step of receiving the transaction request includes receiving the transaction request from a graphics controller, the remapping table is a graphics address remapping table, and the selected data includes graphics data for use by the graphics controller.

9. A method for executing transaction requests in a computer system having a system memory, the method comprising:

receiving a request to load selected data into the system memory;

storing the selected data in a selected memory block of the system memory, the step of storing the selected data in the selected memory block including storing the selected data in a memory page, the selected memory block having a target index that points to a reference location of the selected memory block, the reference location of the selected memory block being a first memory location of the memory page;

storing the target index in a selected virtual register of a remapping table stored in the system memory;

receiving a transaction request that includes a requested virtual address, the requested virtual address including a virtual register pointer that points to the selected virtual register within the remapping table and a target offset that points to a selected target location within the selected memory block, the target offset being an offset relative to the first memory location of the memory page;

accessing the selected virtual register using the virtual register pointer and obtaining the target index stored therein; and accessing the selected target location using the target index and the target offset.

10. A method for managing memory in a computer system having a system memory and a system controller that controls the system memory, the method comprising:

receiving a request to load selected data into the system memory;

storing the selected data in a selected memory block of the system memory, the selected memory block having a target index that points to a reference location of the selected memory block;

storing the target index in a data register of the system controller;

storing a virtual register offset in an index register of the system controller, the virtual register offset referencing a selected virtual register in the system memory;

transferring the target index from the data register to the selected virtual register referenced by the virtual register offset stored in the index register.

11. The method of claim 10, further comprising:

receiving from a memory requester a transaction request that includes a requested virtual address;

converting the requested virtual address to a physical address of the selected virtual register; and accessing a selected target location using the target index stored in the selected virtual register.

12. The method of claim 11 wherein the selected virtual register is one of a plurality of virtual registers in a remapping table and the requested virtual address includes the virtual register offset, the method further comprising:

storing a remapping table index that points to a reference location of the remapping table, wherein the converting step includes combining the remapping table index with the virtual register offset of the requested virtual address to obtain the physical address of the selected virtual register.

13. The method of claim 11 wherein the requested virtual address includes a target offset and the step of accessing the selected target location includes using the target offset and the target index to access the selected target location.

14. The method of claim 13 wherein the step of receiving the transaction request includes receiving the transaction request from a graphics controller, the remapping table is a graphics address remapping table, and the selected data includes graphics data for use by the graphics controller.

15. The method of claim 12 wherein the step of storing the selected data in the selected memory block includes storing the selected data in a memory page and the reference location of the selected memory block is a first memory location of the memory page.

* * * * *

UNITED STATES PATENT AND TRADEMARK OFFICE

CERTIFICATE OF CORRECTION

PATENT NO. : 6,192,457 B1
DATED : February 20, 2001
INVENTOR(S) : A. Kent Porterfield It is certified that error appears in the above-identified patent and that said Letters Patent is hereby corrected as shown below:

Title page,
Item [56], References Cited, U.S. PATENT DOCUMENTS, please add:

| | | | |
|---|---|---|---|
| -- 3,902,163 | 8/75 | Amdahl et al. | 340/172.5 |
| 4,373,179 | 2/83 | Katsumata | 364/200 |
| 4,774,653 | 9/88 | James | 364/200 |
| 4,933,938 | 6/90 | Sheehy | 370/85.13 |
| 5,889,970 | 3/99 | Horan et al. | 395/306 |
| 5,911,051 | 6/99 | Carson et al. | 395/287 |

Column 7,
Line 45, reads "claim 2" should read -- claim 1 --
Line 52, reads "claim 3" should read -- claim 2 --
Line 57, reads "claim 2" should read -- claim 1 --
Line 63, reads "claim 2" should read -- claim 1 --

Column 10,
Line 22, reads "claim 13" should read -- 11 --
Line 27, reads "claim 12" should read -- 10 --

Signed and Sealed this

Ninth Day of July, 2002

*Attest:*

JAMES E. ROGAN

*Attesting Officer*

*Director of the United States Patent and Trademark Office*

UNITED STATES PATENT AND TRADEMARK OFFICE

CERTIFICATE OF CORRECTION

PATENT NO. : 6,192,457 B1
DATED : February 20, 2001
INVENTOR(S) : A. Kent Porterfield It is certified that error appears in the above-identified patent and that said Letters Patent is hereby corrected as shown below:

Title page,
Item [56], References Cited, U.S. PATENT DOCUMENTS, please add:

| | | | |
|---|---|---|---|
| -- 3,902,163 | 8/75 | Amdahl et al. | 340/172.5 |
| 4,373,179 | 2/83 | Katsumata | 364/200 |
| 4,774,653 | 9/88 | James | 364/200 |
| 4,933,938 | 6/90 | Sheehy | 370/85.13 |
| 5,889,970 | 3/99 | Horan et al. | 395/306 |
| 5,911,051 | 6/99 | Carson et al. | 395/287 -- |

Column 7,
Line 45, reads "claim 2" should read -- claim 1 --
Line 52, reads "claim 3" should read -- claim 2 --
Line 57, reads "claim 2" should read -- claim 1 --
Line 63, reads "claim 2" should read -- claim 1 --

Column 10,
Line 22, reads "claim 13" should read -- claim 11 --
Line 27, reads "claim 12" should read -- claim 10 --

This certificate supersedes Certificate of Correction issued July 9, 2002.

Signed and Sealed this

First Day of October, 2002

*Attest:*

JAMES E. ROGAN

*Attesting Officer*

*Director of the United States Patent and Trademark Office*